United States Patent
Khoryaev et al.

(10) Patent No.: US 11,711,176 B2
(45) Date of Patent: Jul. 25, 2023

(54) SYSTEMS AND METHODS FOR NR V2X CSI FEEDBACK WITHOUT DEDICATED REFERENCE SIGNALS

(71) Applicant: APPLE INC., Cupertino, CA (US)

(72) Inventors: Alexey Khoryaev, Nizhny Novgorod (RU); Sergey Panteleev, Nizhny Novgorod (RU); Mikhail Shilov, Nizhny Novgorod (RU); Leonardo Gomes Baltar, Munich (DE); Kilian Roth, Munich (DE)

(73) Assignee: APPLE INC., Cupertino, CA (US)

( * ) Notice: Subject to any disclaimer, the term of this patent is extended or adjusted under 35 U.S.C. 154(b) by 162 days.

(21) Appl. No.: 17/277,108

(22) PCT Filed: Sep. 26, 2019

(86) PCT No.: PCT/US2019/053216
§ 371 (c)(1),
(2) Date: Mar. 17, 2021

(87) PCT Pub. No.: WO2020/069170
PCT Pub. Date: Apr. 2, 2020

(65) Prior Publication Data
US 2021/0367717 A1 Nov. 25, 2021

Related U.S. Application Data

(60) Provisional application No. 62/739,047, filed on Sep. 28, 2018.

(51) Int. Cl.
*H04W 4/40* (2018.01)
*H04L 1/1867* (2023.01)
(Continued)

(52) U.S. Cl.
CPC .......... *H04L 1/1896* (2013.01); *H04L 1/0003* (2013.01); *H04L 1/0026* (2013.01);
(Continued)

(58) Field of Classification Search
CPC ... H04L 1/1896; H04L 1/0003; H04L 1/0026; H04L 5/0051; H04L 12/4013;
(Continued)

(56) References Cited

U.S. PATENT DOCUMENTS

2015/0029952 A1* 1/2015 Huang .................. H04L 1/1812
370/329
2015/0078279 A1* 3/2015 Ko ....................... H04W 52/383
370/329
(Continued)

FOREIGN PATENT DOCUMENTS

| WO | 2018018628 A1 | 2/2018 |
| WO | 2018080568 A1 | 5/2018 |

OTHER PUBLICATIONS

PCT/US2019/053216, International Search Report and Written Opinion, dated Jan. 10, 2020, 10 pages.

*Primary Examiner* — Ian N Moore
*Assistant Examiner* — Latresa A McCallum
(74) *Attorney, Agent, or Firm* — Dorsey & Whitney LLP

(57) ABSTRACT

A user equipment (UE) configured for multi-antenna communication estimates at least one of a rank indicator and a channel quality indicator for device to device (D2D) based on communication data associated with a plurality of packets communicated using D2D communication and without using a dedicated reference signal for D2D communication. The UE may be configured as at least one of a transmitter (Tx) and a receiver (Rx) for vehicle-to-everything (V2X) communication through a sidelink channel.

20 Claims, 12 Drawing Sheets

(51) Int. Cl.
*H04L 1/00* (2006.01)
*H04L 1/1812* (2023.01)
*H04L 5/00* (2006.01)
*H04W 24/10* (2009.01)

(52) U.S. Cl.
CPC .......... *H04L 1/1819* (2013.01); *H04L 5/0051* (2013.01); *H04W 4/40* (2018.02); *H04W 24/10* (2013.01)

(58) Field of Classification Search
CPC .... H04L 12/40136; H04L 43/06; H04W 4/40; H04W 24/10; H04W 28/22; H04W 8/005; H04W 24/02; H04W 36/0083; H04W 36/0088; H04W 40/24; H04W 52/365; H04W 72/08; H04B 1/00; H04B 17/24
See application file for complete search history.

(56) References Cited

U.S. PATENT DOCUMENTS

| | | |
|---|---|---|
| 2017/0019942 A1 | 1/2017 | Ko et al. |
| 2018/0007677 A1 | 1/2018 | Seo et al. |
| 2018/0027437 A1* | 1/2018 | Vitthaladevuni ... H04W 52/343 370/252 |
| 2018/0034608 A1 | 2/2018 | Seo et al. |
| 2018/0234967 A1* | 8/2018 | Kim .................. H04W 4/44 |
| 2019/0075430 A1* | 3/2019 | Lincoln ............ H04W 24/10 |
| 2019/0222255 A1* | 7/2019 | Nammi ............. H04L 1/1896 |
| 2019/0261317 A1* | 8/2019 | Nammi ............. H04L 1/0029 |

* cited by examiner

SYSTEMS AND METHODS FOR NR V2X CSI FEEDBACK WITHOUT DEDICATED REFERENCE SIGNALS

CROSS-REFERENCE TO RELATED APPLICATION(S)

This application is a national stage filing under 35 U.S.C. § 371 of International Patent Application No. PCT/US2019/053216, filed Sep. 26, 2019 which claims the benefit of U.S. Provisional Application No. 62/739,047, filed Sep. 28, 2018, each of which is hereby incorporated by reference herein in its entirety.

TECHNICAL FIELD

This application relates generally to wireless communication systems, and more specifically to device to device (D2D) communications.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

To make an efficient and effective use of multi-antenna technology (e.g., multiple input multiple output (MIMO)) of advanced vehicle-to-everything (V2X) communications, a transmitter (Tx) UE obtains information about the propagation channel, i.e., channel state information (CSI), channel quality indicator (CQI), and/or rank indicator (RI) for the design and/or selection of proper precoding matrices. This is particularly useful for unicast and groupcast modes of transmission, where the overall performance can be improved if MIMO with precoding is employed. Typically, cellular systems employ in the downlink and in the uplink a feedback of the CSI based on a specific or dedicated reference signal (RS). For example, for the NR downlink air interface, CSI-RS are transmitted by the gNB and the UE reports one or several of the following indicators: RI, precoding matrix indicator (PMI) or CQI, CSI resource index (CRI), and/or layer indicator (LI) for phase tracking reference signal (PTRS), depending on the network configuration. This feedback is either periodic or aperiodic. However, there are problems with this closed loop MIMO approach if employed in eV2X sidelink. For example, the CSI quickly becomes outdated even for low to moderate vehicle speeds, making the feedback almost useless. Moreover, the RS incur an extra overhead that reduces the overall spectral efficiency.

In general, the PMI is outdated very quickly, as it depends mainly on the instantaneous realizations of the channel. This is shown, for example, in an evaluation of the graphs shown in FIG. 1 and FIG. 2 illustrating block error rate (BLER) versus signal-to-noise ratio (SNR) in decibels (dB) for various feedback scenarios.

Figure 1:
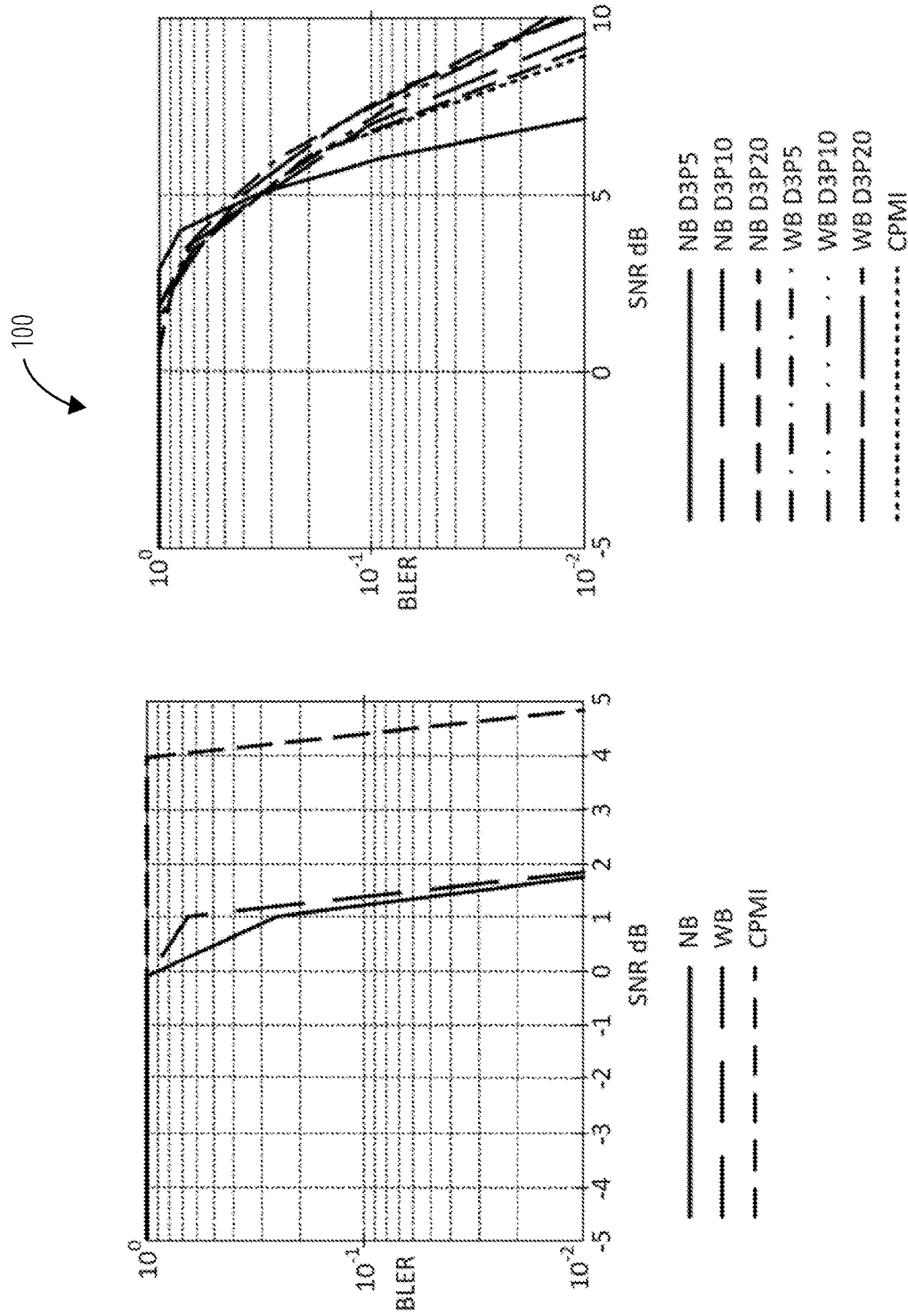
FIG. 1 and FIG. 2 illustrate graphs showing BLER versus SNR for various feedback scenarios.

FIG. 1 illustrates graphs 100 for line-of-sight (LOS) operation, where the graphs on the left correspond to vehicle speeds of zero (0) kilometers per hour (km/h) and the graphs on the right correspond to relative vehicle speeds of 30 km/h.

Figure 2:
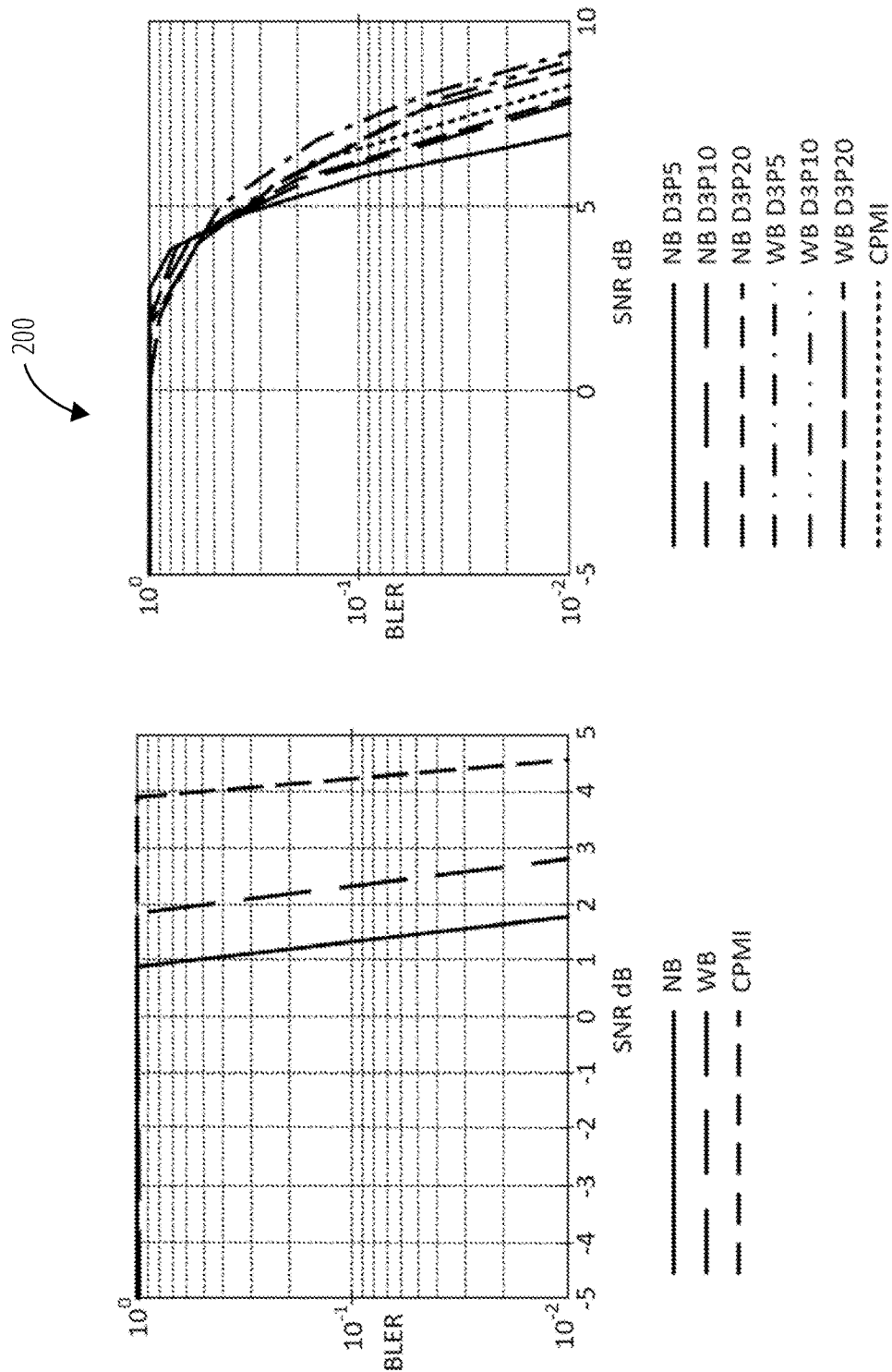

Similarly, FIG. 2 illustrates graphs 200 for non-line-of-sight (NLOS) operation, where the graphs on the left correspond to vehicle speeds of 0 km/h and the graphs on the right correspond to relative vehicle speeds of 30 km/h.

According to 3GPP TS 38.214, including the slot needed for transmitting the feedback, the calculation for the CSI, the minimum delay between transmitting the RS used for PMI estimation and the application of the feedback information at the transmitter are three slots. In addition, since the PMI is changing, the PMI needs to be transmitted periodically. In the legend of FIG. 1 and FIG. 2 the abbreviations DzPy (e.g., D3P5, D3, P10, and D3P20) stand for a delay of z slots and a periodicity of y slots. In the examples shown in FIG. 1 and FIG. 2, narrowband (NB) and wideband (WB) feedback was evaluated as well as precoder cycling (CPMI). The examples show that even for a very moderate relative speed of 30 km/h the performance of open loop PMI cycling is already surpassing the one of closed loop PMI feedback.

Thus, according to certain embodiments herein, various approaches are disclosed to properly obtain transmitter side channel state information (Tx-CSI) to improve D2D communication, such as sidelink enhanced V2X (eV2X) performance when employing MIMO technology, i.e., multiple Tx and Rx antennas.

Existing LTE-V2X sidelink physical layer specifications assume that only broadcast communication mode is used. In that case, any channel adaptation may not be applicable because acquiring a knowledge of all channels may not be practical. For example, it is impractical to employ channel dependent MIMO precoding, since typically it is not possible to find one optimal solution for the many different links between the Tx UE and the multiple Rx UEs.

In the downlink and uplink of NR, CSI-RS and sounding reference signal (SRS), respectively, are used for channel sounding to potentially report an indicator to the other side that can be, for example, a specific precoding matrix. This is the so-called closed loop MIMO approach.

Another alternative solution is to apply channel reciprocity. In this case, CSI is obtained in the reverse link based also in RS for channel sounding, i.e., the CSI obtained while receiving and a reciprocal channel is assumed for the transmission, since the same channel and bandwidth are employed for Tx and Rx in this case.

Disadvantages of the previous solutions include: feedback of CSI may quickly become outdated due to high mobility; CSI-RS and SRS, or any specific RS for channel sounding implies in increased overhead, i.e., reduced overall spectral efficiency; and the reciprocity approach restricts the implementation options for the configuration and antenna allocation by automotive companies. For example, in some implementations the vehicles may utilize different groups of antennas for Tx and Rx. In addition, a proper calibration may be necessary, which implies extra overhead, complexity, and increased latency.

Thus, certain embodiments disclosed herein obtain Tx-CSI that is suitable for NR D2D communication, such as sidelink V2X communications. Such embodiments provide reduced CSI RS overhead for V2X services, flexible implementation of the antenna configurations, and adaptation to the long term parameters of the system instead of instantaneous realizations. To achieve the performance, certain embodiments determine CQI and RI from other existing RS that are reused for demodulation and/or synchronization. In addition, or in other embodiments, precoding cycling is used for RI estimation and reporting.

Certain embodiments disclosed herein provide: significant improvement of V2V demodulation performance of future cellular-V2X systems supporting advanced use cases; significant improvement of spectrum efficiency and reliability of future cellular-V2X communication to improve advanced safety and non-safety related use cases; improve modems for vehicular telematics control units (TCUs) that are used in the automotive industry; and/or provide an optimized communication standard to assist with a fast adoption of the system.

As discussed above, the evaluation shown in FIG. 1 and FIG. 2 leads to the conclusion that PMI feedback, even under ideal channel knowledge at the receiver, may not provide gains even in a relatively slow fading scenario with 30 km/h relative movement speed between Tx and Rx. As it is usually a benefit to adapt the rank of the transmission and the modulation-coding format to optimize the resource utilization and provide sufficient reliability, these parameters may need to be known at the transmitter. The inventors hereof realized from the PMI simulation the instantaneous realization of the channel is changing fast, but as shown in the channel measurements in ICT-619555 RESCUE, "D4.3 Report on channel analysis and modelling", August 2015 and also the simulations assumptions in 3GPP TR 37.885, the large scale parameters stay constant in a larger area. At minimum, the area in which the large scale parameters are similar is in the range of about 7 meters (m) to about 10 m. In addition, it should be considered that one of the applications for unicast and multicast will be platooning wherein the vehicles are driving in the same direction at a similar distance. Thus, the large scale parameters stay coherent for an even longer time. Thus, for NR V2X there is a benefit of adapting to the large scale parameters.

In the next step, the transmitter may acquire the channel information according to the large scale parameters. This is different than the case for uplink and downlink, where the feedback is only based on the instantaneous realization of the channel. Since certain embodiments adapt to more long term parameters of the system, considering dedicated reference signals can be considered to be a large overhead, as these reference signals need to be transmitted periodically. As averaging may be performed over a number of realizations, this is a larger overhead as compared to the operation in the uplink and downlink. Therefore, certain embodiments herein provide for estimating these parameters of the system utilizing other signals transmitted during the continuous exchange of information.

In line with the current assumption for the study item of NR V2X, it is herein assumed in certain embodiments that handshaking is also used to exchange preliminary information about channel quality. Afterwards, during the continuous exchange of data the CQI and RI are estimated by each device and feedback is sent to the other participating transmitters. In various embodiments discussed below, CQI is adapted from the outer loop link adaption, CQI is based on long term channel statistics, RI is based on long term channel statistics, and/or RI is based on precoder cycling without PMI feedback.

CQI Adapted from the Outer Loop Link Adaptation

In one embodiment, the outer loop link adaptation is employed based on hybrid automatic repeat request (HARD). The CQI can then be derived based on the acknowledgment (ACK) and negative acknowledgment (NACK) responses. In this case, if a modulation-coding scheme is selected and the amount of NACK is increasing over a period of time, the bits per symbol may be reduced. In a similar fashion, if there are no NACK responses occurring or the NACK responses decrease over a period of time, the spectral efficiency may be too small and the bits per symbol may be increased. This adjustment can either happen in the transmitter itself as it would need a feedback of this information to initiate retransmissions, or it could be part of the feedback from the receiver to the transmitter. Further, in certain embodiments, the adaption may be a gradual process wherein the modulation-coding scheme is only readjusted every X number of received ACK/NACK responses. For example, the modulation-coding scheme may be adjusted every ten received ACK/NACK responses.

In addition, or in other embodiments, the outer-loop may take into account the overall loading in the environment and interference measurements. Given that a vehicle UE may always be expected to perform sensing and reception from other UEs, the vehicle UE is expected to be well aware of radio-environment conditions.

CQI Based on the Long Term Channel Statistics

In one embodiment, CQI may be based on long term channel statistics. A receiver typically estimates the channel based on demodulation reference signal (DMRS) to demodulate the transmission. This information may be used to calculate the CQI based on the long term statistics of the estimated channel. The CQI based on the channel's long term statistics may afterwards be reported to the transmitter. The DMRS may, for example be also used to measure the level of interference per sub-channel, e.g., per a physical resource block (PRB). Both the channel and interference measurement may, for example, be averaged or weighted over a certain period of time and/or transmission bandwidth, and used for CQI estimation.

RI Based on the Long Term Channel Statistics

In one embodiment, the RI may also be estimated based on the long term channel statistics. The DMRS may, for example, also be the basis for the RI estimation. In certain such embodiments, if the channel coefficients that are received at different receive antennas at the same subcarrier and orthogonal frequency division multiplexing (OFDM) symbol are highly correlated, the channel has a rank defect and multiple spatial layers cannot be supported. However, if the channel coefficients are only weakly correlated, multiple spatial layers may be supported. In certain embodiments, the estimate of the correlation may be an average of multiple receptions and may subsequently be fed back to the transmitter.

In addition, or in other embodiments, precoder cycling may also enable MIMO channel measurement if the precoders are constructed from a unitary matrix or emulate TX antenna selection. Therefore, the knowledge of MIMO channel may be derived from DMRS signals and used for RI detection and feedback.

RI Based Precoder Cycling without PMI Feedback

In one embodiment, the RI may be based on precoder cycling without PMI feedback. As described above, PMI feedback may not provide benefits to a system. To increase diversity, precoder cycling should therefore be used. The device may, for example, exchange information about the used codebook and which part of the codebook is used during either the initial handshaking or inside the control information that is accompanied during each transmission. With the information about the used precoding matrix, the receiver may, for example, estimate the channel without precoding from the DRMS base channel estimate, which is used for the demodulation. From the precoding matrix information the rank of the channel may, for example, be estimated and fed back to the transmitter.

Example Methods

Figure 3:
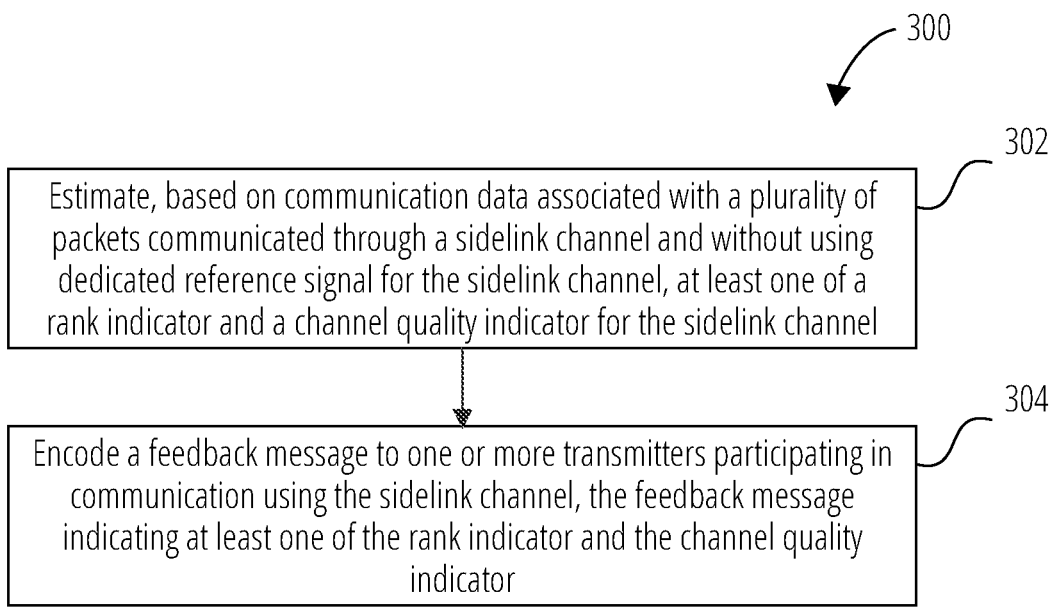
FIG. 3 is a flowchart of a method for a UE configured for multi-antenna D2D communication in accordance with one embodiment.

FIG. 3 is a flowchart of a method 300 for a UE configured for multi-antenna D2D communication according to one embodiment. The UE may be configured, for example, as a transmitter (Tx) and/or a receiver (Rx) for V2X communication through, for example, a sidelink channel. In block 302, the method 300 estimates, based on communication data associated with a plurality of packets communicated through the sidelink channel and without using a dedicated reference signal for the sidelink channel, at least one of a rank indicator and a channel quality indicator for the sidelink channel. In block 304, the method 300 encodes a feedback message to one or more transmitters participating in communication using the sidelink channel, the feedback message indicating at least one of the rank indicator and the channel quality indicator.

Figure 4:
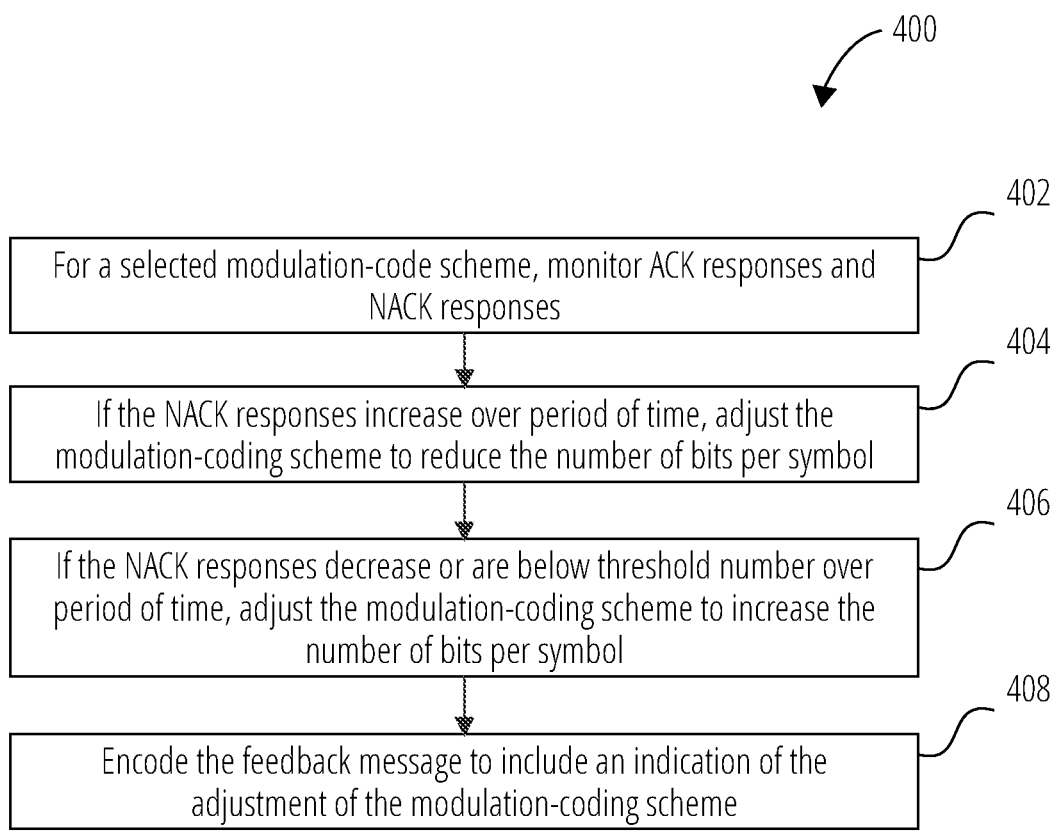
FIG. 4 is a flowchart of a method for using HARQ information in accordance with one embodiment.

In certain embodiments, the communication data comprises HARQ information including ACK responses and NACK responses associated with the plurality of packets communicated through the sidelink channel. For example, FIG. 4 is a flowchart of a method 400 for using HARQ information according to one embodiment. In block 402, for a selected modulation-codes scheme, the method 400 monitors the ACK responses and the NACK responses. In block 404, if the NACK responses increase over a period of time, the method 400 adjusts the modulation-coding scheme to reduce a number of bits per symbol. In block 406, if the NACK responses decrease or are below a threshold number over the period of time, the method 400 adjusts the modulation-coding scheme to increase the number of bits per symbol. In block 408, the method 400 encodes the feedback message to include an indication of an adjustment of the modulation-coding scheme.

Figure 5:
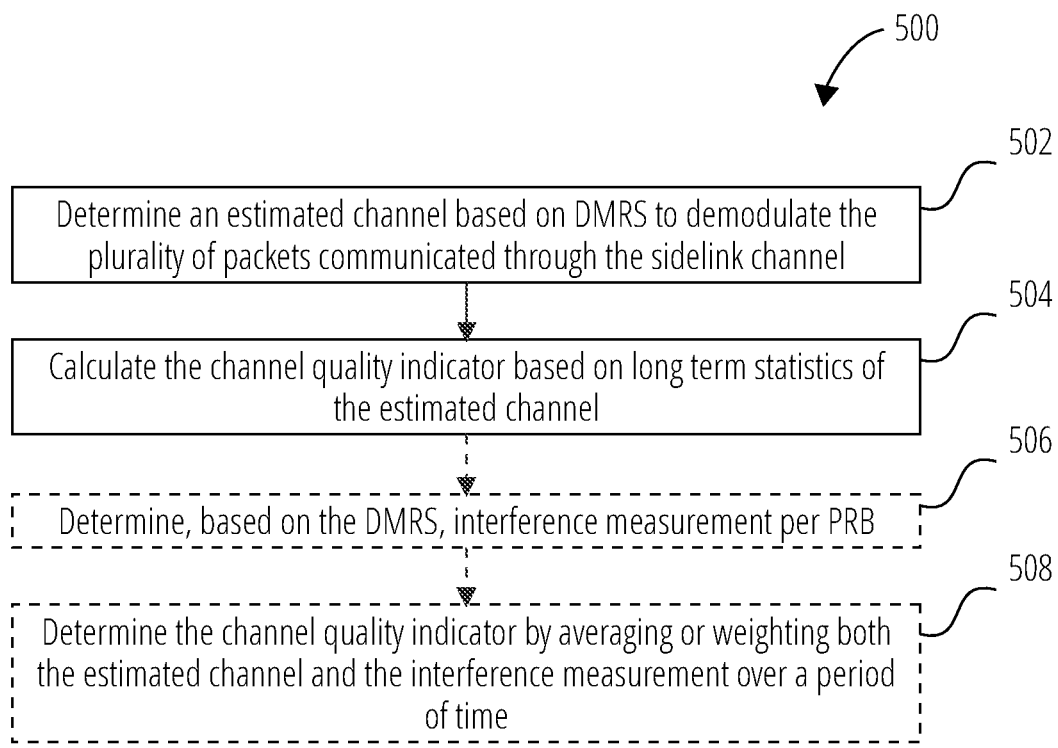
FIG. 5 is a flowchart of a method for estimating the channel quality indicator based on the DMRS in accordance with one embodiment.

In certain embodiments, the communication data comprises demodulation information associated with demodulation of the plurality of packets received at the UE through the sidelink channel over a period of time. For example, the demodulation information may include DMRS. FIG. 5 is a flowchart of a method 500 for estimating the channel quality indicator based on the DMRS according to one embodiment. In block 502, the method 500 determines an estimated channel based on the DMRS to demodulate the plurality of packets communicated through the sidelink channel. In block 504, the method 500 calculates the channel quality indicator based on long term statistics of the estimated channel. In certain such embodiments, the method 500 (in block 506) determines, based on the DMRS, an interference measurement per physical resource block (PRB), and (in block 508) determines the channel quality indicator by averaging or weighting both the estimated channel and the interference measurement over the period of time.

Figure 6:
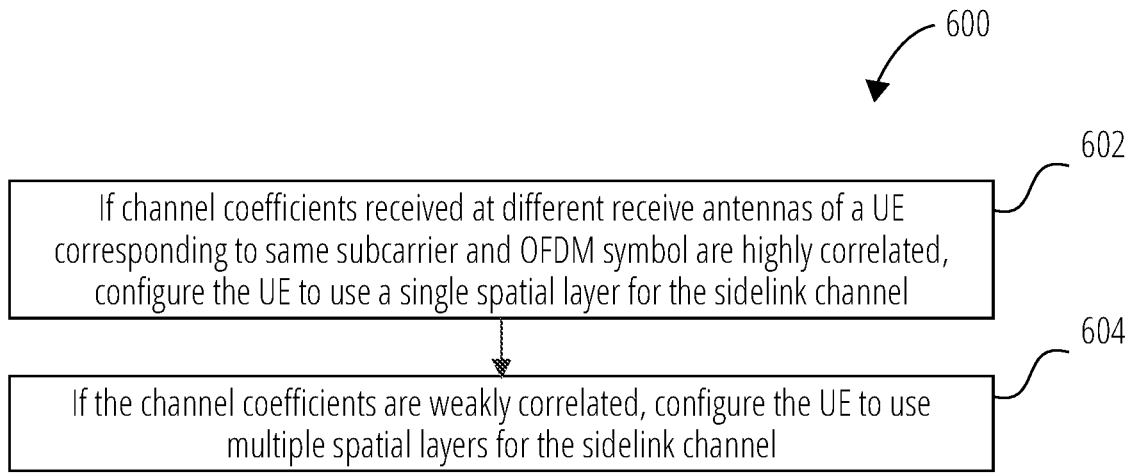
FIG. 6 is a flowchart of a method for determining the rank indicator on long term channel statistics in accordance with one embodiment.

In certain embodiments, the rank indicator may also be estimated based on the DMRS or other the long term channel statistics. For example, FIG. 6 is a flowchart of a method 600 for determining the rank indicator on long term channel statistics according to one embodiment. In block 602, if channel coefficients received at different receive antennas of the UE corresponding to a same subcarrier and OFDM symbol are highly correlated, the method 600 configures the UE to use a single spatial layer for the sidelink channel. In block 604, if the channel coefficients are weakly correlated, the method 600 configures the UE to use multiple spatial layers for the sidelink channel.

Figure 7:
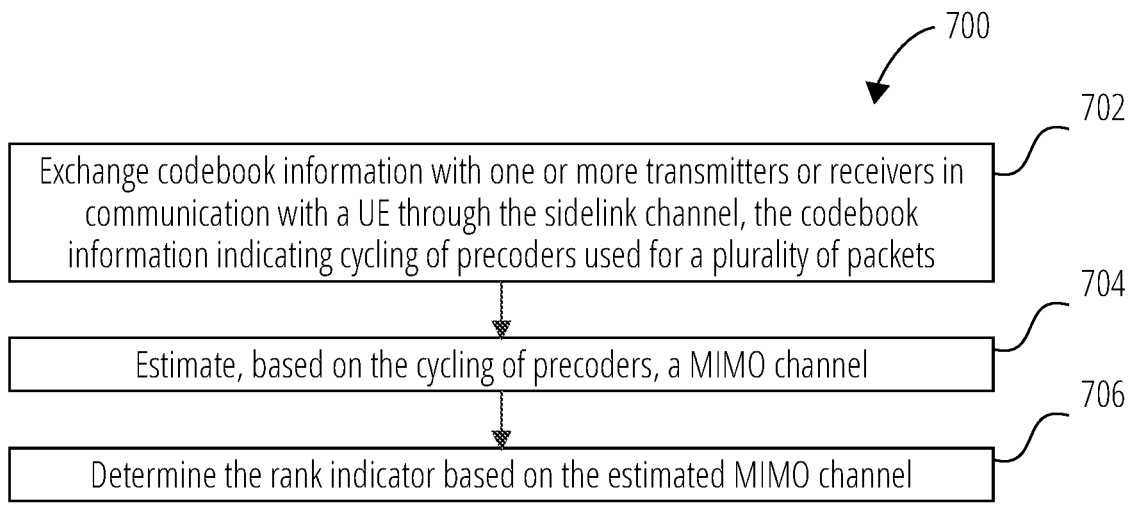
FIG. 7 is a flowchart of a method for determining a rank indicator based on precoder cycling in accordance with one embodiment.

FIG. 7 is a flowchart of a method 700 for determining a rank indicator based on precoder cycling. In block 702, the method 700 exchanges codebook information with one or more transmitters or receivers in communication with the UE through the sidelink channel. The codebook information indicates a cycling of precoders used for the plurality of packets. In block 704, the method 700 estimates, based on the cycling of precoders, a MIMO channel. In block 706, the method 700 determines the rank indicator based on the MIMO channel.

Example Systems and Apparatuses

Figure 8:
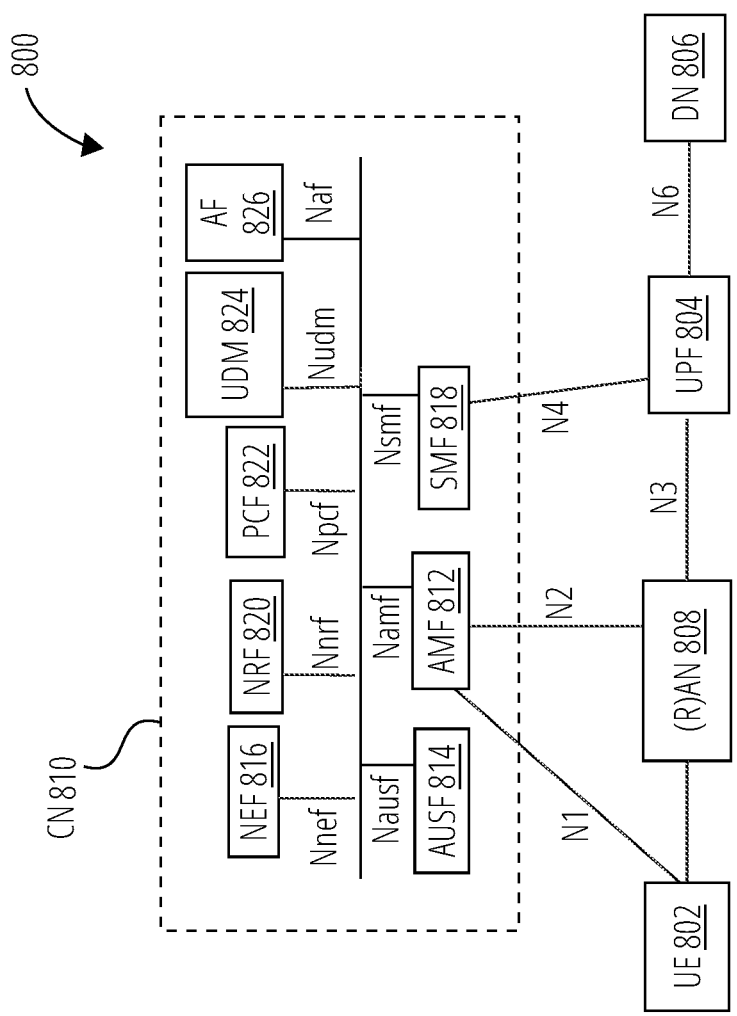
FIG. 8 illustrates a system in accordance with one embodiment.

FIG. 8 illustrates an architecture of a system 800 of a network in accordance with some embodiments. The system 800 is shown to include a UE 802; a 5G access node or RAN node (shown as (R)AN node 808); a User Plane Function (shown as UPF 804); a Data Network (DN 806), which may be, for example, operator services, Internet access or 3rd party services; and a 5G Core Network (5GC) (shown as CN 810).

The CN 810 may include an Authentication Server Function (AUSF 814); a Core Access and Mobility Management Function (AMF 812); a Session Management Function (SMF 818); a Network Exposure Function (NEF 816); a Policy Control Function (PCF 822); a Network Function (NF) Repository Function (NRF 820); a Unified Data Management (UDM 824); and an Application Function (AF 826). The CN 810 may also include other elements that are not shown, such as a Structured Data Storage network function (SDSF), an Unstructured Data Storage network function (UDSF), and the like.

The UPF 804 may act as an anchor point for intra-RAT and inter-RAT mobility, an external PDU session point of interconnect to DN 806, and a branching point to support multi-homed PDU session. The UPF 804 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 804 may include an uplink classifier to support routing traffic flows to a data network. The DN 806 may represent various network operator services, Internet access, or third party services.

The AUSF 814 may store data for authentication of UE 802 and handle authentication related functionality. The AUSF 814 may facilitate a common authentication framework for various access types.

The AMF 812 may be responsible for registration management (e.g., for registering UE 802, etc.), connection management, reachability management, mobility management, and lawful interception of AMF-related events, and access authentication and authorization. AMF 812 may provide transport for SM messages for the SMF 818, and act as a transparent proxy for routing SM messages. AMF 812 may also provide transport for short message service (SMS) messages between UE 802 and an SMS function (SMSF) (not shown by FIG. 8). AMF 812 may act as Security Anchor Function (SEA), which may include interaction with the AUSF 814 and the UE 802, receipt of an intermediate key that was established as a result of the UE 802 authentication process. Where USIM based authentication is used, the AMF 812 may retrieve the security material from the AUSF 814. AMF 812 may also include a Security Context Management (SCM) function, which receives a key from the SEA that it uses to derive access-network specific keys. Furthermore, AMF 812 may be a termination point of RAN CP interface (N2 reference point), a termination point of NAS (NI) signaling, and perform NAS ciphering and integrity protection.

AMF 812 may also support NAS signaling with a UE 802 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 802 and AMF 812, and relay uplink and downlink user-plane packets between the UE 802 and UPF 804. The N3IWF also provides mechanisms for IPsec tunnel establishment with the UE 802.

The SMF 818 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 818 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 816 may provide means for securely exposing the services and capabilities provided by 3GPP network functions for third party, internal exposure/re-exposure, Application Functions (e.g., AF 826), edge computing or fog computing systems, etc. In such embodiments, the NEF 816 may authenticate, authorize, and/or throttle the AFs. NEF 816 may also translate information exchanged with the AF 826 and information exchanged with internal network functions. For example, the NEF 816 may translate between an AF-Service-Identifier and an internal 5GC information. NEF 816 may also receive information from other network functions (NFs) based on exposed capabilities of other network functions. This information may be stored at the NEF 816 as structured data, or at a data storage NF using a standardized interfaces. The stored information can then be re-exposed by the NEF 816 to other NFs and AFs, and/or used for other purposes such as analytics.

The NRF 820 may support service discovery functions, receive NF Discovery Requests from NF instances, and provide the information of the discovered NF instances to the NF instances. NRF 820 also maintains information of available NF instances and their supported services.

The PCF 822 may provide policy rules to control plane function(s) to enforce them, and may also support unified policy framework to govern network behavior. The PCF 822 may also implement a front end (FE) to access subscription information relevant for policy decisions in a UDR of UDM 824.

The UDM 824 may handle subscription-related information to support the network entities' handling of communication sessions, and may store subscription data of UE 802. The UDM 824 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 822. UDM 824 may also support SMS management, wherein an SMS-FE implements the similar application logic as discussed previously.

The AF 826 may provide application influence on traffic routing, access to the Network Capability Exposure (NCE), and interact with the policy framework for policy control. The NCE may be a mechanism that allows the 5GC and AF 826 to provide information to each other via NEF 816, which may be used for edge computing implementations. In such implementations, the network operator and third party services may be hosted close to the UE 802 access point of attachment to achieve an efficient service delivery through the reduced end-to-end latency and load on the transport network. For edge computing implementations, the 5GC may select a UPF 804 close to the UE 802 and execute traffic steering from the UPF 804 to DN 806 via the N6 interface. This may be based on the UE subscription data, UE location, and information provided by the AF 826. In this way, the AF 826 may influence UPF (re)selection and traffic routing. Based on operator deployment, when AF 826 is considered to be a trusted entity, the network operator may permit AF 826 to interact directly with relevant NFs.

As discussed previously, the CN 810 may include an SMSF, which may be responsible for SMS subscription checking and verification, and relaying SM messages to/from the UE 802 to/from other entities, such as an SMS-GMSC/IWMSC/SMS-router. The SMS may also interact with AMF 812 and UDM 824 for notification procedure that the UE 802 is available for SMS transfer (e.g., set a UE not reachable flag, and notifying UDM 824 when UE 802 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 810 may include an Nx interface, which is an inter-CN interface between the MME and the AMF 812 in order to enable interworking between CN 810 and other core networks.

Although not shown by FIG. 8, the system 800 may include multiple RAN nodes (such as (R)AN node 808) wherein an Xn interface is defined between two or more (R)AN node 808 (e.g., gNBs and the like) that connecting to 5GC 410, between a (R)AN node 808 (e.g., gNB) connecting to CN 810 and an eNB, and/or between two eNBs connecting to CN 810.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 802 in a connected mode (e.g., CM-CONNECTED) including functionality to manage the UE mobility for connected mode between one or more (R)AN node 808. The mobility support may include context transfer from an old (source) serving (R)AN node 808 to new (target) serving (R)AN node 808; and control of user plane tunnels between old (source) serving (R)AN node 808 to new (target) serving (R)AN node 808.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
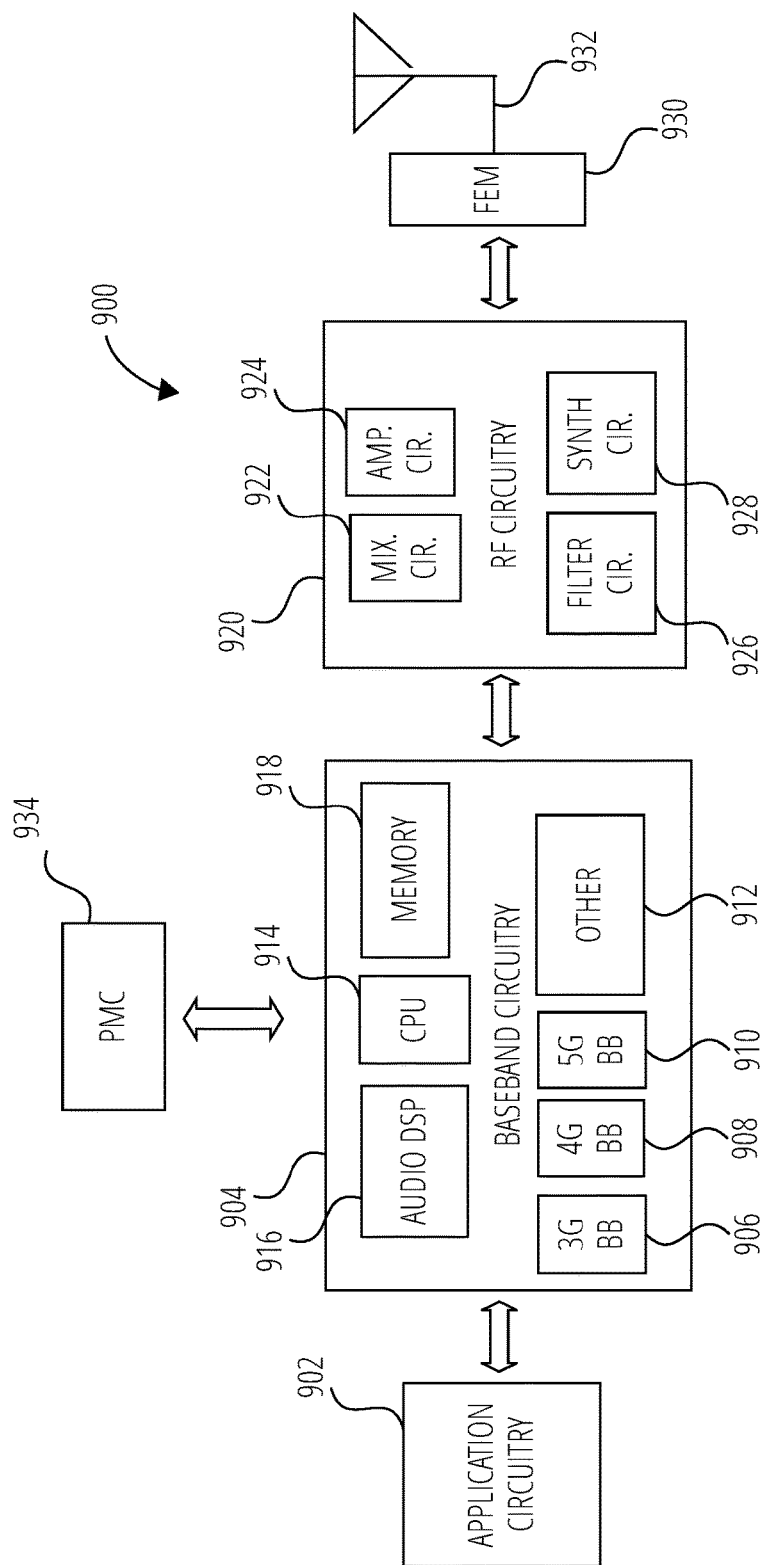
FIG. 9 illustrates a device in accordance with one embodiment.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing Unit (CPU 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
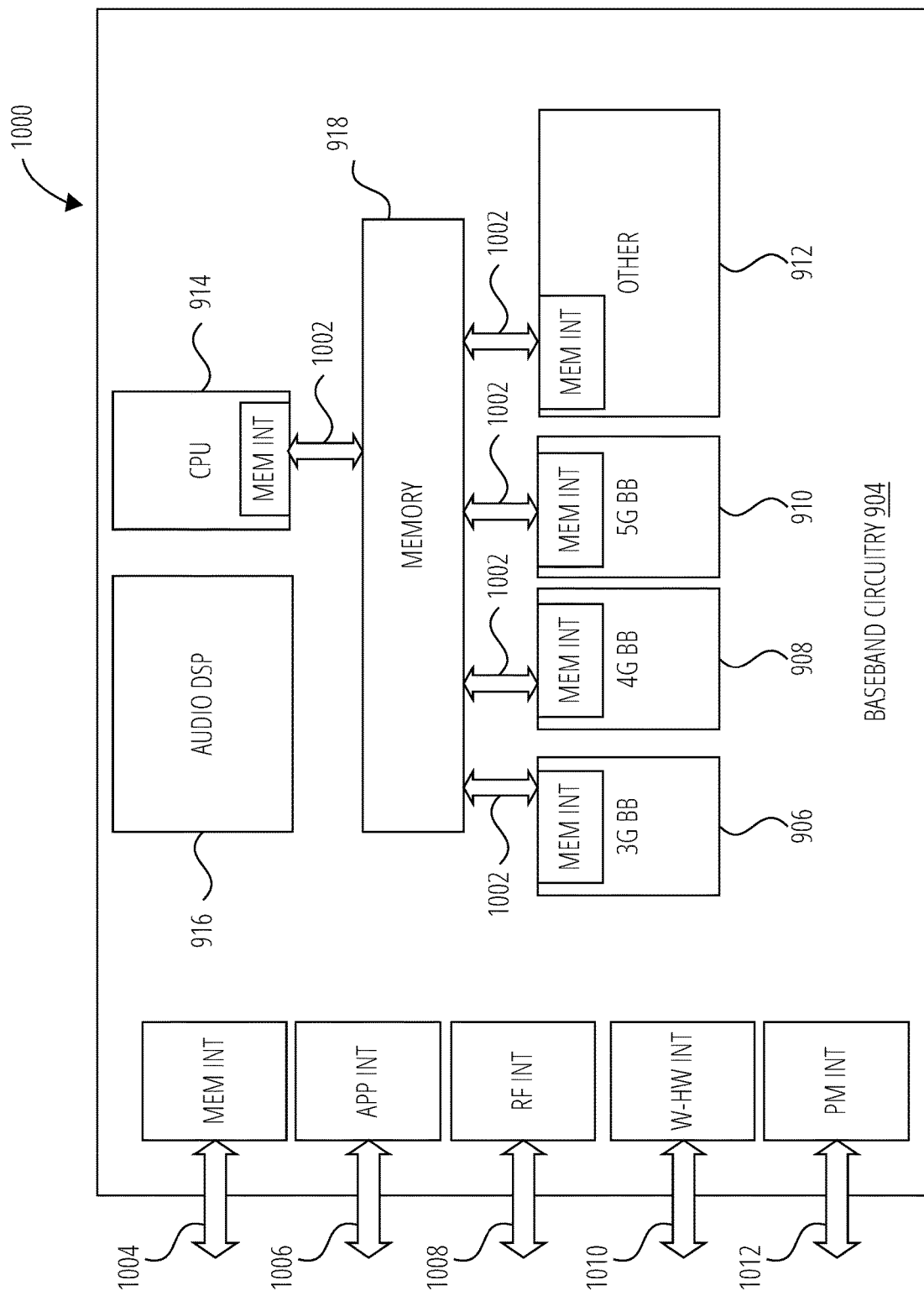
FIG. 10 illustrates an example interfaces in accordance with one embodiment.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
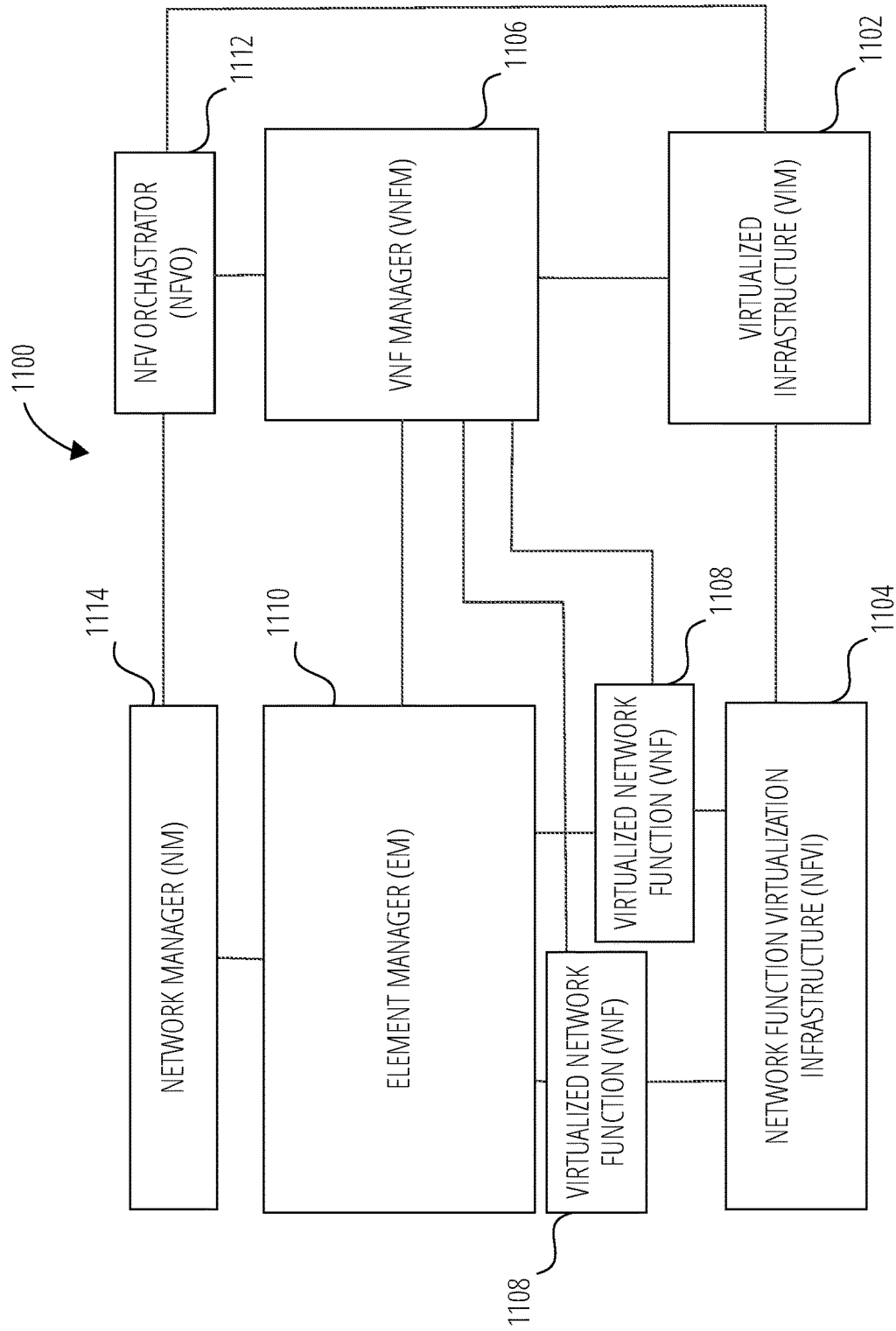
FIG. 11 illustrates a system in accordance with one embodiment.

FIG. 11 is a block diagram illustrating components, according to some example embodiments, of a system 1100 to support NFV. The system 1100 is illustrated as including a virtualized infrastructure manager (shown as VIM 1102), a network function virtualization infrastructure (shown as NFVI 1104), a VNF manager (shown as VNFM 1106), virtualized network functions (shown as VNF 1108), an element manager (shown as EM 1110), an NFV Orchestrator (shown as NFVO 1112), and a network manager (shown as NM 1114).

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNF 1108. The VNF 1108 may be used to execute EPC components/functions. The VNFM 1106 may manage the life cycle of the VNF 1108 and track performance, fault and security of the virtual aspects of VNF 1108. The EM 1110 may track the performance, fault and security of the functional aspects of VNF 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
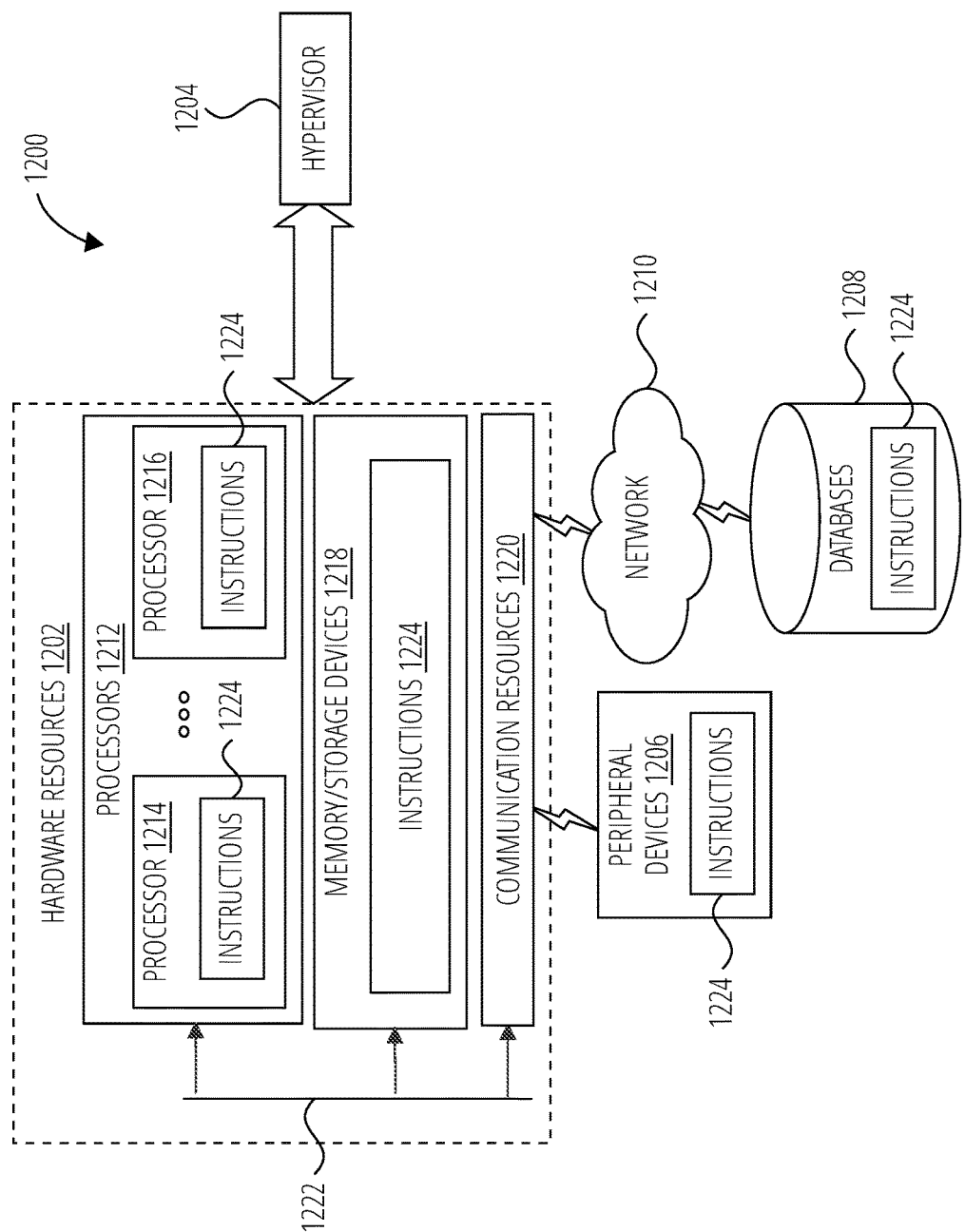
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1210. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is an apparatus for a user equipment (UE) configured for multi-antenna communication. The apparatus includes a memory interface a processor. The memory interface to send or receive, to or from a memory device, communication data associated with a plurality of packets communicated using device to device (D2D) communication. The processor to: estimate, based on the communication data and without using a dedicated reference signal for the D2D communication, at least one of a rank indicator and a channel quality indicator for the D2D communication; and encode a feedback message to one or more transmitters participating in the D2D communication, the feedback message indicating at least one of the rank indicator and the channel quality indicator.

Example 2 is the apparatus of Example 1, wherein the UE is configured as at least one of a transmitter (Tx) and a receiver (Rx) for vehicle-to-everything (V2X) communication.

Example 3 is the apparatus of Example 1, wherein the communication data comprises hybrid automatic repeat request (HARD) information include acknowledgment (ACK) responses and negative acknowledgment (NACK) responses associated with the plurality of packets.

Example 4 is the apparatus of Example 3, wherein the processor is further configured to: for a selected modulation-code scheme, monitor the ACK responses and the NACK responses; if the NACK responses increase over a period of time, adjust the modulation-coding scheme to reduce a number of bits per symbol; if the NACK responses decrease or are below a threshold number over the period of time, adjust the modulation-coding scheme to increase the number of bits per symbol; and encode the feedback message to include an indication of an adjustment of the modulation-coding scheme.

Example 5 is the apparatus of Example 1, wherein to adjust the modulation-coding scheme comprises only adjusting the modulation-coding scheme every X number of received ACK/NACK responses.

Example 6 is the apparatus of Example 1, wherein the communication data comprises demodulation information associated with demodulation of the plurality of packets received at the UE using the D2D communication over a period of time.

Example 7 is the apparatus of Example 6, wherein the demodulation information comprises a demodulation reference signal (DMRS).

Example 8 is the apparatus of Example 7, wherein the processor is further configured to: determine an estimated channel based on the DMRS to demodulate the plurality of packets; and calculate the channel quality indicator based on long term statistics of the estimated channel.

Example 9 is the apparatus of Example 8, wherein the processor is further configured to: determine, based on the DMRS, an interference measurement per sub-channel; and determine the channel quality indicator by averaging or weighting both the estimated channel and the interference measurement over at least one of the period of time and a bandwidth used for transmission.

Example 10 is the apparatus of Example 8, wherein the processor is further configured to estimate the rank indicator based on the long term statistics of the estimated channel.

Example 11 is the apparatus of Example 10, wherein the processor is further configured to: if channel coefficients received at different receive antennas of the UE corresponding to a same subcarrier and orthogonal frequency division multiplexing (OFDM) symbol are highly correlated, configure the UE to use a single spatial layer for the D2D communication; and if the channel coefficients are weakly correlated, configure the UE to use multiple spatial layers for the D2D communication.

Example 12 is the apparatus of Example 1, wherein the processor is further configured to: exchange codebook information with one or more transmitters or receivers in communication with the UE using the D2D communication, the codebook information indicating a cycling of precoders used for the plurality of packets; estimate, based on the cycling of precoders, a multiple input multiple output (MIMO) channel; and determine the rank indicator based on the MIMO channel.

Example 13 is a non-transitory computer-readable storage medium. The computer-readable storage medium including instructions that when executed by a baseband processor of a vehicle-to-everything (V2X) device, cause the baseband processor to: estimate, based on communication data associated with a plurality of packets communicated using device to device (D2D) communication and without using a dedicated reference signal for the D2D communication, at least one of a rank indicator and a channel quality indicator for the D2D communication; and encode a feedback message to one or more transmitters participating in communication using the D2D communication, the feedback message indicating at least one of the rank indicator and the channel quality indicator.

Example 14 is the computer-readable storage medium of Example 13, wherein the communication data comprises hybrid automatic repeat request (HARD) information include acknowledgment (ACK) responses and negative acknowledgment (NACK) responses associated with the plurality of packets communicated.

Example 15 is the computer-readable storage medium of Example 14, wherein the instructions further configure the baseband processor to: for a selected modulation-code scheme, monitor the ACK responses and the NACK responses; if the NACK responses increase over a period of time, adjust the modulation-coding scheme to reduce a number of bits per symbol; if the NACK responses decrease or are below a threshold number over the period of time, adjust the modulation-coding scheme to increase the number of bits per symbol; and encode the feedback message to include an indication of an adjustment of the modulation-coding scheme.

Example 16 is the apparatus of Example 15, wherein to adjust the modulation-coding scheme comprises only adjusting the modulation-coding scheme every X number of received ACK/NACK responses.

Example 17 is the computer-readable storage medium of Example 13, wherein the communication data comprises demodulation information associated with demodulation of the plurality of packets received at the V2X device over a period of time.

Example 18 is the computer-readable storage medium of Example 17, wherein the demodulation information comprises a demodulation reference signal (DMRS).

Example 19 is the computer-readable storage medium of Example 18, wherein the instructions further configure the baseband processor to: determine an estimated channel based on the DMRS to demodulate the plurality of packets; and calculate the channel quality indicator based on long term statistics of the estimated channel.

Example 20 is the computer-readable storage medium of Example 19, wherein the instructions further configure the baseband processor to: determine, based on the DMRS, an interference measurement per sub-channel; and determine the channel quality indicator by averaging or weighting both the estimated channel and the interference measurement over at least one of the period of time and a bandwidth used for transmission.

Example 21 is the computer-readable storage medium of Example 19, wherein the instructions further configure the baseband processor to estimate the rank indicator based on the long term statistics of the estimated channel.

Example 21 is the computer-readable storage medium of Example 20, wherein the instructions further configure the baseband processor to: if channel coefficients received at different receive antennas of the V2X device corresponding to a same subcarrier and orthogonal frequency division multiplexing (OFDM) symbol are highly correlated, configure the UE to use a single spatial layer for the D2D communication; and if the channel coefficients are weakly correlated, configure the V2X device to use multiple spatial layers for the D2D communication.

Example 23 is the computer-readable storage medium of Example 13, wherein the instructions further configure the baseband processor to: exchange codebook information with one or more transmitters or receivers in communication with the V2X device, the codebook information indicating a cycling of precoders used for the plurality of packets; estimate, based on the cycling of precoders, a multiple input multiple output (MIMO) channel; and determine the rank indicator based on the MIMO channel.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus for a user equipment (UE) configured for multi-antenna communication, the apparatus comprising:

a memory interface to send or receive, to or from a memory device, communication data associated with a plurality of packets communicated using device to device (D2D) communication, wherein the communication data comprises demodulation information associated with demodulation of the plurality of packets received at the UE using the D2D communication over a period of time, and wherein the demodulation information comprises a demodulation reference signal (DMRS); and a processor to:

estimate, based on the communication data and without using a dedicated reference signal for the D2D communication, at least one of a rank indicator and a channel quality indicator for the D2D communication;

encode a feedback message to one or more transmitters participating in the D2D communication, the feedback message indicating at least one of the rank indicator and the channel quality indicator;

determine an estimated channel based on the DMRS to demodulate the plurality of packets;

determine, based on the DMRS, an interference measurement per sub-channel; and determine the channel quality indicator by averaging or weighting both the estimated channel and the interference measurement over at least one of the period of time and a bandwidth used for transmission.

2. The apparatus of claim 1, wherein the UE is configured as at least one of a transmitter (Tx) and a receiver (Rx) for vehicle-to-everything (V2X) communication.

3. The apparatus of claim 1, wherein the communication data comprises hybrid automatic repeat request (HARQ) information include acknowledgment (ACK) responses and negative acknowledgment (NACK) responses associated with the plurality of packets.

4. The apparatus of claim 3, wherein the processor is further configured to:

for a selected modulation-code scheme, monitor the ACK responses and the NACK responses;

if the NACK responses increase over a period of time, adjust the modulation-coding scheme to reduce a number of bits per symbol;

if the NACK responses decrease or are below a threshold number over the period of time, adjust the modulation-coding scheme to increase the number of bits per symbol; and encode the feedback message to include an indication of an adjustment of the modulation-coding scheme.

5. The apparatus of claim 4, wherein to adjust the modulation-coding scheme comprises only adjusting the modulation-coding scheme every X number of received ACK/NACK responses.

6. The apparatus of claim 1, wherein the processor is further configured to:

calculate the channel quality indicator based on long term statistics of the estimated channel.

7. The apparatus of claim 6, wherein the processor is further configured to estimate the rank indicator based on the long term statistics of the estimated channel.

8. The apparatus of claim 7, wherein the processor is further configured to:

if channel coefficients received at different receive antennas of the UE corresponding to a same subcarrier and orthogonal frequency division multiplexing (OFDM) symbol are highly correlated, configure the UE to use a single spatial layer for the D2D communication; and if the channel coefficients are weakly correlated, configure the UE to use multiple spatial layers for the D2D communication.

9. The apparatus of claim 1, wherein the processor is further configured to:
exchange codebook information with one or more transmitters or receivers in communication with the UE using the D2D communication, the codebook information indicating a cycling of precoders used for the plurality of packets;
estimate, based on the cycling of precoders, a multiple input multiple output (MIMO) channel; and
determine the rank indicator based on the MIMO channel.

10. A non-transitory computer-readable storage medium, the computer-readable storage medium including instructions that when executed by a baseband processor of a vehicle-to-everything (V2X) device, cause the baseband processor to:
estimate, based on communication data associated with a plurality of packets communicated using device to device (D2D) communication and without using a dedicated reference signal for the D2D communication, at least one of a rank indicator and a channel quality indicator for the D2D communication, wherein the communication data comprises demodulation information associated with demodulation of the plurality of packets received at the V2X device over a period of time, and wherein the demodulation information comprises a demodulation reference signal (DMRS); and
encode a feedback message to one or more transmitters participating in communication using the D2D communication, the feedback message indicating at least one of the rank indicator and the channel quality indicator;
determine an estimated channel based on the DMRS to demodulate the plurality of packets;
determine, based on the DMRS, an interference measurement per sub-channel; and
determine the channel quality indicator by averaging or weighting both the estimated channel and the interference measurement over at least one of the period of time and a bandwidth used for transmission.

11. The computer-readable storage medium of claim 10, wherein the communication data comprises hybrid automatic repeat request (HARD) information include acknowledgment (ACK) responses and negative acknowledgment (NACK) responses associated with the plurality of packets communicated.

12. The computer-readable storage medium of claim 11, wherein the instructions further configure the baseband processor to:
for a selected modulation-code scheme, monitor the ACK responses and the NACK responses;
if the NACK responses increase over a period of time, adjust the modulation-coding scheme to reduce a number of bits per symbol;
if the NACK responses decrease or are below a threshold number over the period of time, adjust the modulation-coding scheme to increase the number of bits per symbol; and
encode the feedback message to include an indication of an adjustment of the modulation-coding scheme.

13. The computer-readable storage medium of claim 12, wherein to adjust the modulation-coding scheme comprises only adjusting the modulation-coding scheme every X number of received ACK/NACK responses.

14. The computer-readable storage medium of claim 10, wherein the instructions further configure the baseband processor to:
calculate the channel quality indicator based on long term statistics of the estimated channel.

15. An apparatus for a user equipment (UE) configured for multi-antenna communication, the apparatus comprising:
a memory interface to send or receive, to or from a memory device, communication data associated with a plurality of packets communicated using device to device (D2D) communication; and
a processor to:
estimate, based on the communication data and without using a dedicated reference signal for the D2D communication, at least one of a rank indicator and a channel quality indicator for the D2D communication;
encode a feedback message to one or more transmitters participating in the D2D communication, the feedback message indicating at least one of the rank indicator and the channel quality indicator;
exchange codebook information with one or more transmitters or receivers in communication with the UE using the D2D communication, the codebook information indicating a cycling of precoders used for the plurality of packets;
estimate, based on the cycling of precoders, a multiple input multiple output (MIMO) channel; and
determine the rank indicator based on the MIMO channel.

16. The apparatus of claim 15, wherein the UE is configured as at least one of a transmitter (Tx) and a receiver (Rx) for vehicle-to-everything (V2X) communication.

17. The apparatus of claim 15, wherein the communication data comprises hybrid automatic repeat request (HARD) information include acknowledgment (ACK) responses and negative acknowledgment (NACK) responses associated with the plurality of packets.

18. The apparatus of claim 17, wherein the processor is further configured to:
for a selected modulation-code scheme, monitor the ACK responses and the NACK responses;
if the NACK responses increase over a period of time, adjust the modulation-coding scheme to reduce a number of bits per symbol;
if the NACK responses decrease or are below a threshold number over the period of time, adjust the modulation-coding scheme to increase the number of bits per symbol; and
encode the feedback message to include an indication of an adjustment of the modulation-coding scheme.

19. The apparatus of claim 18, wherein to adjust the modulation-coding scheme comprises only adjusting the modulation-coding scheme every X number of received ACK/NACK responses.

20. The apparatus of claim 15, wherein the communication data comprises demodulation information associated with demodulation of the plurality of packets received at the UE using the D2D communication over a period of time.

* * * * *